United States Patent
Kim et al.

(10) Patent No.: US 10,844,206 B2
(45) Date of Patent: Nov. 24, 2020

(54) POLYPROPYLENE-BASED RESIN COMPOSITION

(71) Applicant: LG Chem, Ltd., Seoul (KR)

(72) Inventors: Hyo Ju Kim, Daejeon (KR); In Sung Park, Daejeon (KR); Sang Eun Park, Daejeon (KR); Hae Woong Park, Daejeon (KR); Kyung Bok Bae, Daejeon (KR); Choong Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 60 days.

(21) Appl. No.: 16/304,869

(22) PCT Filed: Sep. 18, 2017

(86) PCT No.: PCT/KR2017/010159
§ 371 (c)(1),
(2) Date: Nov. 27, 2018

(87) PCT Pub. No.: WO2018/056654
PCT Pub. Date: Mar. 29, 2018

(65) Prior Publication Data
US 2020/0010657 A1    Jan. 9, 2020

(30) Foreign Application Priority Data

Sep. 23, 2016  (KR) .................. 10-2016-0122448

(51) Int. Cl.
| | |
|---|---|
| *C08L 23/12* | (2006.01) |
| *C08F 4/659* | (2006.01) |
| *C08F 4/6592* | (2006.01) |
| *C08F 210/16* | (2006.01) |
| *C08L 23/08* | (2006.01) |
| *C08L 23/14* | (2006.01) |

(52) U.S. Cl.
CPC ............ *C08L 23/12* (2013.01); *C08F 4/6592* (2013.01); *C08F 4/65912* (2013.01); *C08F 210/16* (2013.01); *C08L 23/0815* (2013.01); *C08L 23/142* (2013.01); *C08L 2207/02* (2013.01); *C08L 2314/06* (2013.01)

(58) Field of Classification Search
CPC .... C08L 23/0815; C08L 23/142; C08L 23/14; C08L 2207/02; C08L 2314/06; C08F 4/65912; C08F 210/16; C08F 4/6592; C08F 4/69504; C08F 2/06; C08F 2420/02; C08F 2420/04; C08F 2420/06; C08F 2500/08; C08F 2500/12
See application file for complete search history.

(56) References Cited

U.S. PATENT DOCUMENTS

| | | | |
|---|---|---|---|
| 5,874,513 A * | 2/1999 | Watanabe et al. ...... | B32B 27/32 526/348.1 |
| 2001/0027221 A1 | 10/2001 | Bambara et al. | |
| 2003/0022998 A1 | 1/2003 | Karande et al. | |
| 2003/0139546 A1 | 7/2003 | Jain et al. | |
| 2008/0255311 A1 | 10/2008 | Chang et al. | |
| 2011/0269893 A1 | 11/2011 | Pellegatti et al. | |
| 2013/0253150 A1 | 9/2013 | Lu et al. | |
| 2013/0345377 A1 | 12/2013 | Ker et al. | |
| 2017/0114165 A1 | 4/2017 | Ishihama et al. | |
| 2017/0218105 A1 | 8/2017 | Kim et al. | |
| 2018/0201706 A1 * | 7/2018 | Park et al. ............ | C08F 212/36 |
| 2018/0223014 A1 | 8/2018 | Woo et al. | |

FOREIGN PATENT DOCUMENTS

| | | | |
|---|---|---|---|
| EP | 3318601 A1 | 5/2018 | |
| JP | 2001508819 A | 7/2001 | |
| JP | 3378073 B2 | 2/2003 | |
| JP | 4813197 B2 | 11/2011 | |
| JP | 2015510970 A | 4/2015 | |
| KR | 100556319 B1 | 3/2006 | |
| KR | 20080070637 A | 7/2008 | |
| KR | 20110104031 A | 9/2011 | |
| KR | 20150027235 A | 3/2015 | |
| KR | 20160061107 A | 5/2016 | |
| KR | 20170067642 A | 6/2017 | |
| KR | 101847702 B1 | 4/2018 | |
| KR | 101889598 B1 * | 8/2018 | .......... C08F 2500/02 |
| WO | 9914271 A1 | 3/1999 | |
| WO | 2015152268 A1 | 10/2015 | |

OTHER PUBLICATIONS

European Search Report for Appln No. 17853368.3, dated May 29, 2019, 8 pages.
Search report from International Application No. PCT/KR2017/010159, dated Jan. 12, 2018.

* cited by examiner

*Primary Examiner* — Nathan M Nutter
(74) *Attorney, Agent, or Firm* — Lerner, David, Littenberg, Krumholz & Mentlik, LLP

(57) ABSTRACT

The present invention relates to a polypropylene-based resin composition which exhibits mechanical properties such as excellent strength and more improved impact strength, and a molded article comprising the same. The polypropylene-based resin composition comprises: a polypropylene-based resin; and an olefin-based copolymer, and shows two or more elution temperatures at a predetermined temperature range when analyzing the olefin-based copolymer by temperature rising elution fractionation (TREF).

17 Claims, 3 Drawing Sheets

[FIG. 1]
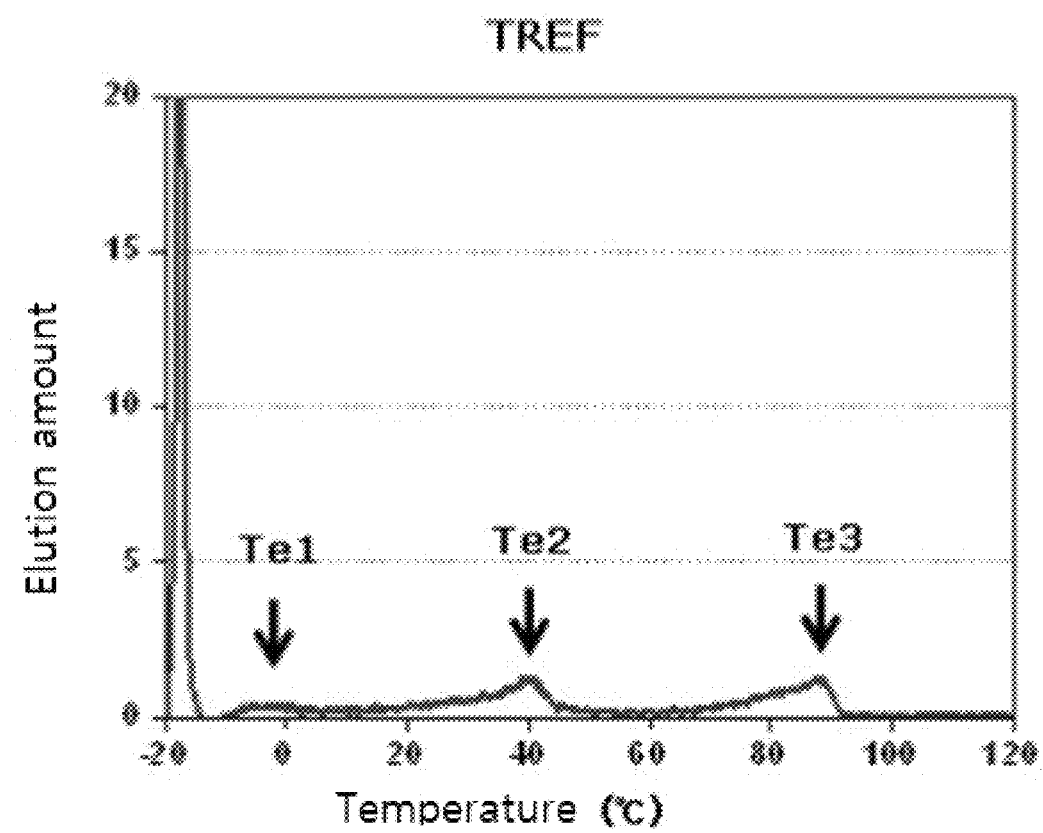

[FIG. 2]
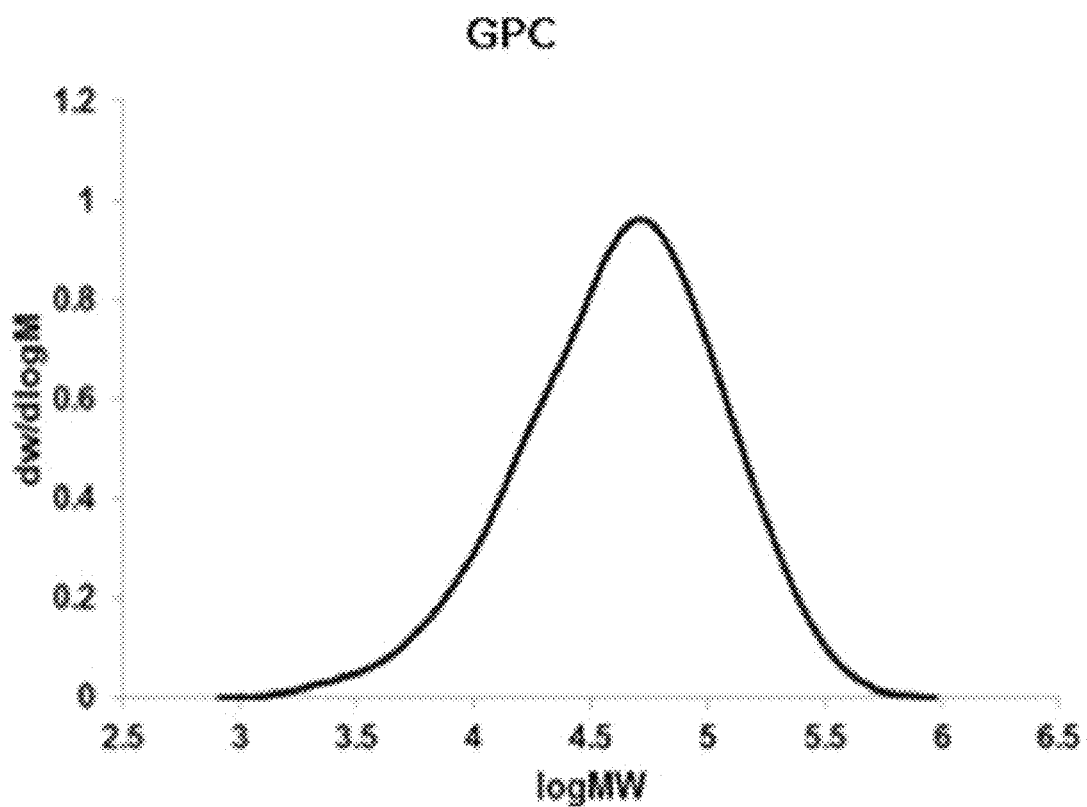

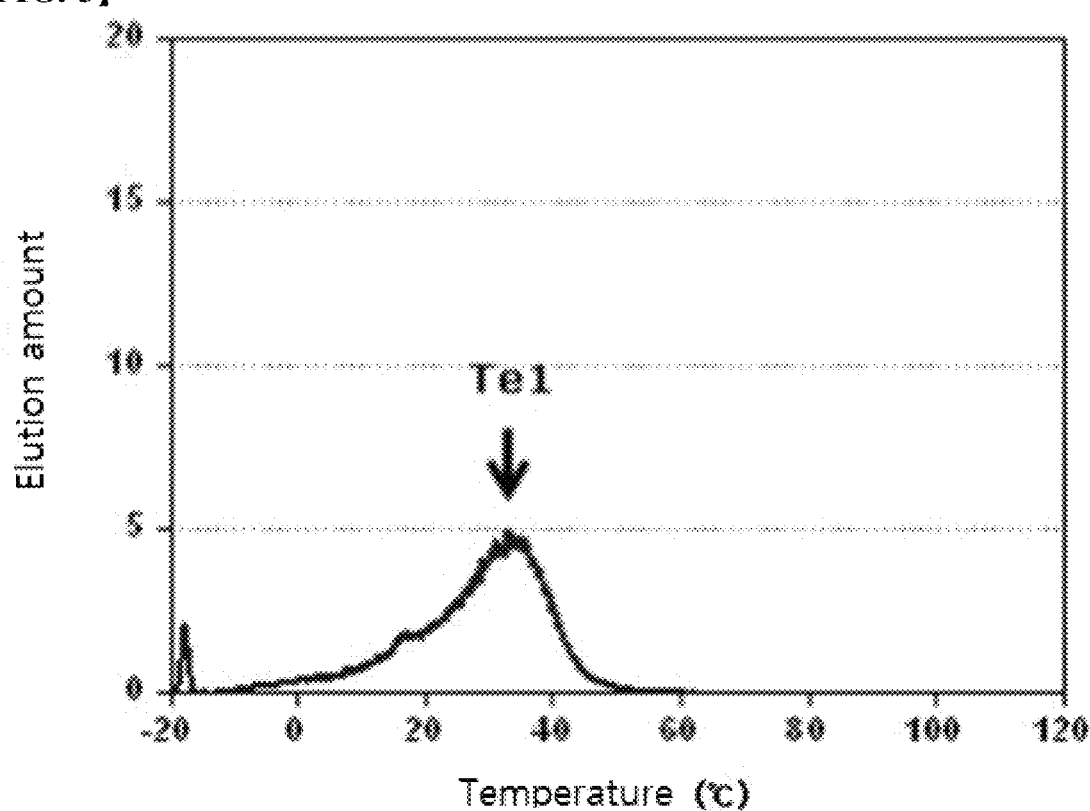
[FIG. 3]

POLYPROPYLENE-BASED RESIN COMPOSITION

CROSS-REFERENCE TO RELATED APPLICATIONS

The present application is a national phase entry under 35 U.S.C. § 371 of International Application No. PCT/KR2017/010159 filed Sep. 18, 2017, which claims priority from Korean Patent Application No. 10-2016-0122448 filed Sep. 23, 2016, all of which are incorporated herein by reference.

TECHNICAL FIELD

The present invention relates to a polypropylene-based resin composition exhibiting mechanical properties such as excellent strength and having more improved impact strength, and a molded article comprising the same.

BACKGROUND

A polypropylene-based resin composition containing a polypropylene-based resin as a main component and containing various additives is generally applied to various fields and applications such as a composition for interior and exterior parts of automobiles.

However, in such a conventional polypropylene resin composition, an impact reinforcement material is often contained in order to reinforce an impact strength of the polypropylene-based resin. Until the mid-1990's, prior to development of ethylene-alpha-olefin copolymers polymerized by applying a metallocene catalyst, a rubber-based material such as EPR (ethylene propylene rubber) or EPDM (ethylene propylene diene rubber) was mainly used as an impact reinforcement material.

However, since the appearance of the ethylene-alpha-olefin copolymer produced by the metallocene catalyst, olefin-based copolymers or olefin-based elastomers such as ethylene-alpha-olefin copolymers have been mainly applied as an impact reinforcement material.

However, the conventional olefin-based copolymers, or the conventional olefin-based elastomers mainly composed of ethylene-alpha-olefin random copolymers, have basically a single crystal structure, or even if they have a plurality of crystal structures, the difference in crystallinity is not large. Therefore, it is known that it is not easy to simultaneously achieve required properties such as compatibility with other resins, strength and impact strength. For example, when existing olefin-based copolymers or olefin-based elastomers are compounded with polypropylene-based resin to obtain a molded article exhibiting excellent impact strength and mechanical properties, it is necessary to use an olefin elastomer having a relatively low density in order to improve the impact strength of the molded article. However, since these low density olefin-based elastomers exhibit a relatively low strength and can reduce the strength of the polypropylene, they have drawbacks such as difficulty in achieving excellent strength of the polypropylene-based resin composition or the molded article thereof.

Accordingly, there is a continuing demand for the development of a polypropylene-based resin composition exhibiting excellent mechanical strength together with more improved impact strength.

Technical Problem

The present invention provides a polypropylene-based resin composition exhibiting mechanical properties such as excellent strength and having more improved impact strength, and a molded article comprising the same.

Technical Solution

The present invention provides a polypropylene-based resin composition comprising: a polypropylene-based resin; and an olefin-based copolymer containing an ethylene repeating unit and an alpha-olefin-based repeating unit having 4 or more carbon atoms, wherein the olefin-based copolymer shows a single peak when analyzed by gel permeation chromatography, and shows two or more, for example, three elution temperatures, Te1, Te2 and Te3, in a temperature range of −20° C. to 120° C. when analyzed by temperature rising elution fractionation (TREF).

The present invention also provides a molded article comprising the above-described polypropylene-based resin composition.

DETAILED DESCRIPTION OF THE EMBODIMENTS

Hereinafter, the polypropylene resin composition according to embodiments of the present invention will be described in more detail. However, it will be apparent to those skilled in the art that this is presented as an example of the invention and the scope of the invention is not limited thereby, and that various modifications can be made to the embodiments without departing from the scope of the invention.

As used herein, the term "(semi)crystalline" refers to a polymer having a first order transition temperature, a crystal melting point (Tm), an elution point (elution temperature), an associated peak, or the like, when analyzing an olefin-based (co)polymer by temperature rising elution fractionation (TREF), differential scanning calorimetry (DSC) or other equivalent technique. The density, Tm, elution point, etc. of the (semi)crystalline (co)polymer may vary depending on the crystallinity thereof.

In the distinguishing concepts, the term "amorphous" refers to a polymer that does not have a crystal melting point (Tm) and/or an elution point (elution temperature), an associated peak, or the like, or whose (semi)crystallinity is not confirmed through related analytical techniques, when analyzing an olefin-based (co)polymer by temperature rising elution fractionation (TREF), differential scanning calorimetry (DSC) or equivalent technique.

On the other hand, according to one embodiment of the present invention, there is provided a polypropylene-based resin composition comprising: a polypropylene-based resin; and an olefin-based copolymer containing an ethylene repeating unit and an alpha-olefin-based repeating unit, wherein the olefin-based copolymer shows a single peak when analyzed by gel permeation chromatography (GPC), and shows two or more, for example, three elution temperatures, Te1, Te2 and Te3, in a temperature range of −20° C. to 120° C. when analyzed by temperature rising elution fractionation (TREF).

Such a polypropylene-based resin composition includes an olefin-based copolymer satisfying novel crystalline properties defined based on the GPC analysis result and the TREF analysis result. As will be further described below, the olefin-based copolymer shows peaks at two or more, for example, three different elution temperatures when subjected to TREF analysis. This may mean that the olefin-based copolymer contains two or more kinds of semi-crystalline olefin-based copolymers corresponding to each peak (for example, three kinds of semi-crystalline olefin-based copolymers having different crystallinity). Herein, the two or more elution temperatures, for example, Te2 and Te3, may appear at 10° C. to 80° C., and 40° C. to 120° C., respectively. This usually shows a single peak during TREF analysis, and thus defines novel crystal structure and crystalline properties that are clearly distinguished from existing olefin-based copolymers including only copolymers that have a single crystal structure or that the difference in crystallinity is not large.

As the polypropylene-based resin composition of one embodiment contains the olefin-based copolymer exhibiting such novel crystal structure and crystalline properties as an impact reinforcement material, it has been found that it can exhibit more improved impact strength while maintaining excellent mechanical properties inherent to polypropylene-based resin. This is presumably because, as the olefin-based copolymer contains two or more kinds of copolymers (polymer chains) having different crystallinity together, it can exhibit excellent compatibility with a polypropylene-based resin and complement general mechanical properties and impact strength at the same time.

Therefore, a molded article exhibiting excellent physical properties, particularly excellent mechanical properties and impact strength together can be provided by using the polypropylene-based resin composition containing such an olefin-based copolymer.

Hereinafter, the above-mentioned olefin-based copolymer and the preparation method thereof will be specifically described, and other components and the like of the polypropylene-based resin composition containing the same will be specifically described.

The olefin-based copolymer contained in the polypropylene-based resin composition may include, for example, a first semi-crystalline olefin-based copolymer, a second semi-crystalline olefin-based copolymer and a third semi-crystalline olefin-based copolymer, corresponding to the respective elution temperatures. When the olefin-based copolymer is analyzed by TREF, it can have a peak (P1, Te1) for a first semi-crystalline olefin-based copolymer, a peak (P2, Te2) for a second semi-crystalline olefin-based copolymer and a peak (P3, Te3) for a third semi-crystalline olefin-based copolymer in a temperature range of −20° C. to 120° C. In this case, the elution temperatures (Te) of the respective peaks were expressed as Te1, Te2 and Te3, respectively.

The TREF analysis of such olefin-based copolymer may be carried out by using, for example, a TREF equipment from Polymer Char, and in one example, the analysis can be carried out by using o-dichlorobenzene as a solvent while elevating the temperature from −20° C. to 1300.

When the olefin copolymer is analyzed by TREF, Te1 may be present at a relatively lower temperature than Te2 and Te2 may be present at a relatively lower temperature than Te3. When the density of the olefin-based copolymer is in a range of 0.850 to 0.910 g/cc, the Te1 may be in a range of −20° C. to 100° C., the Te2 may be 0° C. to 120° C., and the Te3 may be in a range of 20° C. to 120° C. Further, in a more specific example, the olefin-based copolymer has a density of 0.86 g/cc to 0.88 g/cc. In TREF analysis, the Te1 may be in a range of −20° C. to 30° C., the Te2 may be in a range of 10° C. to 80° C., and the Te3 may be in a range of 40° C. to 120° C.

In this case, Te (Elution temperature) means the temperature at the highest point of each peak in a TREF elution curve expressed by an elution amount with respect to temperature (dW/dT), and a fractional ratio of the first to third semi-crystalline olefin-based copolymers corresponding to each peak can be calculated as the integration value with respect to the lower area of each corresponding peak in the TREF elution curve (temperature-elution amount graph).

In a specific example relating to the method of calculating the fractionation ratio, the initiation point of each peak is defined as a point initiating the elution of the polymer on the basis of a base line, and the end point of each peak is defined as a point terminating the elution of the polymer on the basis of the base line. In the case that the peak P1 for a first semi-crystalline olefin-based polymer and the peak P2 for a second semi-crystalline olefin-based polymer are partially overlapped, a point where an elution amount value (dC/dT) is the lowest in an overlapped area may be defined as the terminal point of the peak P1 and as the initiation point of the peak P2. In addition, a peak exhibited at a temperature range from −20° C. to −10° C. can be shown by the blending of an amorphous polymer and a low crystalline polymer, and thus the peak shown at this position may be treated by adding to the fractional ratio of the peak P1.

In the case of calculating each fraction ratio by the above-described method, the fraction ratio (area %) of a peak (P1, Te1) for a first semi-crystalline olefin copolymer may be 5 to 90%, or 30 to 80%, the fraction ratio of a peak (P2, Te2) for a second semi-crystalline olefin copolymer may be 5 to 90%, or 5 to 40%, and the fraction ratio of a peak (P3, Te1) for a third semi-crystalline olefin copolymer may be 5 to 90%, or 5 to 50% when the olefin-based copolymer is analyzed by TREF.

As the olefin-based copolymer includes the first to third semi-crystalline olefin-based copolymers defined by the above-described three elution temperature peaks and the fraction ratio of each of these copolymers (peaks) is included within the above-mentioned range, the resin composition and the molded article of one embodiment including the same can exhibit more improved impact strength and mechanical properties.

On the other hand, the above-described olefin-based copolymer can show three crystallization temperatures (Tc1, Tc2, Tc3) in the DSC curve obtained as the result of DSC analysis. When the density of the olefin-based copolymer is, for example, 0.850 g/cc to 0.910 g/cc, in the crystallization temperature, Tc1 may be 5° C., or less, Tc2 may be 0° C. to 60° C., and Tc3 may be 80° C. to 130° C. These crystallization temperatures and ranges may also reflect the novel crystal structure and crystalline properties of the above-described olefin-based copolymer.

That is, in the case of previously known olefin-based copolymers, such as olefin-based elastomers, only one crystallization temperature is confirmed by DSC, and in the olefin-based copolymer contained in the resin composition of one embodiment, three crystallization temperatures are confirmed, which may reflect the presence of different first to third semi-crystalline olefin-based copolymers. In addition, as the olefin-based copolymer has three crystallization temperatures as describe above, the olefin-based copolymer including the first to third semi-crystalline copolymers can improve the thermal stability and mechanical strength since the crystals can be melted and crystallized at different temperatures. Thereby, the resin composition of one embodiment containing the same can also exhibit excellent heat resistance, mechanical properties, impact strength and the like.

The crystallization temperature can be measured and defined as a peak of the cooling curve of the heat flow in the temperature-heat flow graph of the differential scanning calorimeter (DSC), that is, as an exothermic peak temperature during cooling. Specifically, the crystallization temperature can be measured by using a differential scanning calorimeter 6000 (DSC) manufactured by PerKinElmer, which is measured with a peak value of a cooling curve of the heat flow (measured by DSC), after filling 0.5 mg to 10 mg of a sample in a measurement container, setting the nitrogen gas flow rate to 20 ml/min, raising the temperature of the sample from 0° C. to 150° C., at a rate of 20° C./min in order to make the thermal history of the measurement sample equal, maintaining that temperature for 2 minutes and then lowering the temperature from 150° C. to −100° C., at a rate of 10° C./min again.

The above-described olefin-based copolymer may exhibit a low density range of 0.850 to 0.910 g/cc, or 0.860 to 0.880 g/cc as measured according to ASTM D-792. Usually, the density of the olefin-based copolymer is affected by the type and content of the monomers used in the polymerization, the degree of polymerization, and the like. The copolymer is greatly affected by the content of the comonomer. As the above-described olefin-based copolymer is prepared by using a specific catalyst composition described later, it may contain a larger amount of comonomer-derived repeating units (alpha-olefin-based repeating units), and consequently have a low density in the range as described above. By satisfying the novel crystalline structure and properties together with such low density, the polypropylene-based resin composition can further improve the impact strength without lowering the strength thereof.

In addition, the above-described olefin-based copolymer has a melt index (MI) of 0.1 to 100 g/10 min, more specifically 0.1 to 50 g/10 min, still more specifically 0.1 to 30 g/10 min as measured at 190° C. under a load of 2.16 kg according to ASTM D1238. The melt index (MI), which affects the mechanical properties, impact strength, and moldability of the olefin-based copolymer, may be controlled by adjusting the amount of catalyst used in the polymerization process. Since the olefin copolymer satisfies the range of the melt index (MI) together with the low density as described above, it can further improve impact strength, moldability and the like of the resin composition of one embodiment.

In addition, when two or more kinds of polymers are mixed, the molecular weight distribution (MWD) is usually increased, and consequently the impact strength and mechanical properties are decreased, and blocking phenomenon occurs. However, even if the olefin-based copolymer contained in the resin composition of one embodiment contains the first to third semi-crystalline olefin-based copolymers (i.e., exhibits two or more peaks in the DSC analysis result or the TREF analysis result), it can have a monomodal single peak in the molecular weight distribution curve in the GPC measurement, and can exhibit a narrow molecular weight distribution.

For example, the olefin-based copolymer may have a molecular weight distribution (MWD) of 1.5 to 4.0, specifically 1.5 to 3.0, which is a ratio (Mw/Mn) between a weight average molecular weight (Mw) and a number average molecular weight (Mn). Further, the olefin-based copolymer may have a weight average molecular weight (Mw) of 10.000 to 500,000 g/mol, more specifically 20,000 to 200.000 g/mol within the above-mentioned molecular weight distribution range.

In this way, as a relatively narrow molecular weight distribution and an appropriate molecular weight range are satisfied even while containing the first to third semi-crystalline olefin-based copolymers, the resin composition of one embodiment containing the olefin-based copolymer can exhibit superior impact strength, mechanical properties and the like. The weight average molecular weight (Mw) and the number average molecular weight (Mn) can be measured by a molecular weight in terms of polystyrene which is analyzed by gel permeation chromatography (GPC).

In one preferred embodiment, the olefin-based copolymer described above may further satisfy the following requirements (1) to (3), in addition to the novel crystalline properties/structure which are confirmed as the result of TREF analysis:

(1) Density: 0.850 to 0.910 g/cc, or 0.860 to 0.890 g/cc, or 0.865 to 0.880 g/cc.

(2) Melt index measured at 190° C. under a load of 2.16 kg: 0.1 to 100 g/10 min, or 1.0 to 50 g/10 min, or 1.5 to 30 g/10 min, and (3) Molecular weight distribution (MWD): 1.5 to 4.0, or 1.8 to 3.7, or 2.0 to 3.5.

Meanwhile, the above-mentioned olefin-based copolymer may contain 50 to 90% by weight of an ethylene repeating unit and the remaining amount of an alpha-olefin-based repeating unit.

The olefin-based copolymer may be a copolymer comprising an ethylene-based repeating unit, and an alpha-olefin-based repeating unit having 4 or more carbon atoms. In this case, the alpha-olefin-based repeating unit may be a repeating unit derived from an alpha-olefin having 4 or more carbon atoms, such as 1-butene, 1-pentene, 4-methyl-1-pentene, 1-hexene, 1-heptene, 1-octene, 1-decene, 1-undecene, 1-dodecene, 1-tetradecene, 1-hexadecene, or the like. In consideration of the excellent impact strength, etc. of the olefin-based copolymer, it may be appropriately a repeating unit derived from 1-octene.

The above-mentioned olefin-based copolymer alone exhibits excellent physical properties required for olefin-based elastomers or the like, and also exhibits excellent compatibility as well as more improved strength and impact strength when compounded with a polypropylene-based resin.

On the other hand, it has been confirmed that the above-mentioned olefin-based copolymer can be produced by a preparation method using a specific catalyst system described later. More specifically, the olefin-based copolymer can be produced by a preparation method comprising the step of copolymerizing ethylene and alpha-olefin in the presence of a catalyst composition comprising a transition metal compound of the following Chemical Formula 1 and a transition metal compound of the following Chemical Formula 2:

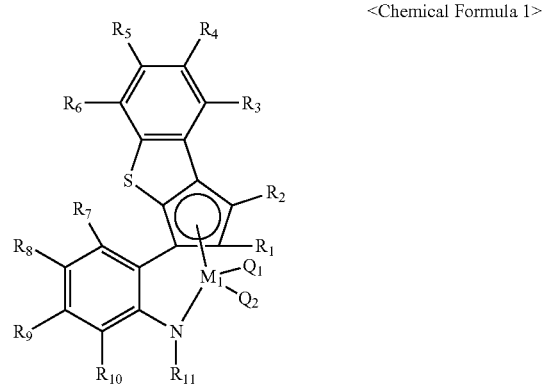

<Chemical Formula 1>

<Chemical Formula 2>

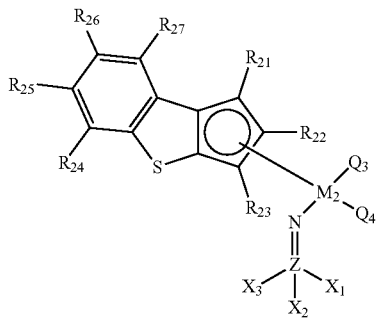

in Chemical Formulae 1 and 2, $M_1$ and $M_2$ are each independently a Group 4 transition metal, $Q_1$, $Q_2$, $Q_3$ and $Q_4$ are each independently selected from the group consisting of hydrogen, a halogen, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, an alkylamido group having 1 to 20 carbon atoms, an arylamido group having 6 to 20 carbon atoms, and an alkylidene having 1 to 20 carbon atoms, $R_1$ to $R_6$ may be each independently selected from the group consisting of hydrogen, a halogen, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms and a metalloid radical of a Group 14 metal substituted with a hydrocarbyl group having 1 to 20 carbon atoms; or at least two adjacent functional groups of $R_1$ to $R_6$ may be connected to each other to form an aliphatic ring having 5 to 20 carbon atoms or an aromatic ring having 6 to 20 carbon atoms which is unsubstituted or substituted with at least one substituent selected from the group consisting of a halogen, an alkyl group having 1 to 20 carbon atoms, an alkenyl group having 2 to 20 carbon atoms and an aryl group having 6 to 20 carbon atoms;

$R_7$ to $R_{11}$ are each independently selected from the group consisting of hydrogen, a halogen, an amino group, an alkyl amino group (having 1 to 20 carbon atoms), an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, and a metalloid radical of a Group 14 metal substituted with a hydrocarbyl group having from 1 to 20 carbon atoms; or at least two adjacent functional groups of $R_7$ to $R_{11}$ may be connected to each other to form an aliphatic ring having 5 to 20 carbon atoms or an aromatic ring having 6 to 20 carbon atoms which is unsubstituted or substituted with at least one substituent selected from the group consisting of a halogen, an alkyl group having 1 to 20 carbon atoms, an alkenyl group having 2 to 20 carbon atoms and an aryl group having 6 to 20 carbon atoms;

$R_{21}$ to $R_{27}$ are each independently selected from the group consisting of hydrogen, a halogen, a hydrocarbyl group having 1 to 20 carbon atoms, a heterohydrocarbyl group having 1 to 20 carbon atoms, and a metalloid radical of a Group 14 metal substituted with a hydrocarbyl group having from 1 to 20 carbon atoms, specifically, $R_{21}$ to $R_{27}$ are each independently selected from the group consisting of hydrogen, a halogen, a silyl group, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, and a metalloid radical of a Group 14 metal substituted with a hydrocarbyl group having from 1 to 20 carbon atoms;

$X_1$ to $X_3$ are each independently selected from the group consisting of hydrogen, a halogen, a hydrocarbyl group having 1 to 20 carbon atoms and a heterohydrocarbyl group having 1 to 20 carbon atoms, more specifically, are selected from the group consisting of hydrogen, a halogen, a silyl group, an amino group, an alkyl amino group (having 1 to 20 carbon atoms), an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms and an arylalkyl group having 7 to 20 carbon atoms; or at least two adjacent functional groups of $X_1$ to $X_3$ are connected to each other to form an aliphatic ring having 5 to 20 carbon atoms or an aromatic ring having 6 to 20 carbon atoms which is unsubstituted or substituted with at least one substituent selected from the group consisting of a halogen group, a silyl group, an amino group, an alkyl amino group (having 1 to 20 carbon atoms), an alkyl group having 1 to 20 carbon atoms, an alkenyl group having 2 to 20 carbon atoms and an aryl group having 6 to 20 carbon atoms, and Z is phosphorus (P), arsenic (As) or antimony (Sb).

Based on the structural features of the transition metal compounds of Chemical Formulas 1 and 2 as confirmed in the following examples, it has been found that an olefin-based copolymer satisfying the above-described novel crystalline structure and properties can be produced by copolymerizing ethylene and alpha-olefin using the catalyst composition containing them together.

Specifically, in Chemical Formula 1, $M_1$ may be Ti, Hf, or Zr.

Further, in Chemical Formula 1, $Q_1$ and $Q_2$ may be each independently selected from the group consisting of hydrogen, a halogen, and an alkyl group having 1 to 6 carbon atoms.

Further, in Chemical Formula 1, $R_1$ and $R_2$ are an alkyl group having 1 to 20 carbon atoms, more specifically an alkyl group having 1 to 6 carbon atoms, and still more specifically a methyl group.

Further, in Chemical Formula 1, $R_3$ to $R_6$ are each independently hydrogen; an alkyl group having 1 to 20 carbon atoms; or an alkenyl group having 2 to 20 carbon atoms, more specifically, hydrogen or an alkyl group having 1 to 20 carbon atoms, still more specifically, each may be a hydrogen atom.

Further, in Chemical Formula 1, $R_7$ to $R_{10}$ may be each independently hydrogen or an alkyl group having 1 to 6 carbon atoms.

Further, in Chemical formula 1, $R_{11}$ may be an unsubstituted or substituted alkyl group having 1 to 20 carbon atoms, an aryl group having 6 to 20 carbon atoms, or an alkylaryl group having 7 to 20 carbon atoms, wherein the substituent may be any one or at least two selected from the group consisting of a halogen group, an alkyl group having 1 to 20 carbon atoms, an alkenyl group having 2 to 20 carbon atoms, an alkoxy group having 1 to 20 carbon atoms, and an aryloxy group having 6 to 20 carbon atoms. Further, in Chemical Formula 1. $R_{11}$ is connected to $R_{10}$ adjacent to $R_{11}$ to form an aliphatic ring having 5 to 20 carbon atoms or an aromatic ring having 6 to 20 carbon atoms. Herein, the aliphatic ring or the aromatic ring may be substituted with any one or at least two substituents selected from the group consisting of a halogen group, an alkyl group having 1 to 20 carbon atoms, an alkenyl group having 2 to 20 carbon atoms, and an aryl group having 6 to 20 carbon atoms.

More specifically, the transition metal compound represented by Chemical Formula 1 is a compound wherein $R_{11}$ is an unsubstituted or substituted alkyl group having 1 to 20 carbon atoms, an aryl group having 6 to 20 carbon atoms, or an alkylaryl group having 7 to 20 carbon atoms, for example, a compound represented by the following Chemical Formulas, and any one or a mixture of two or more thereof may be used.

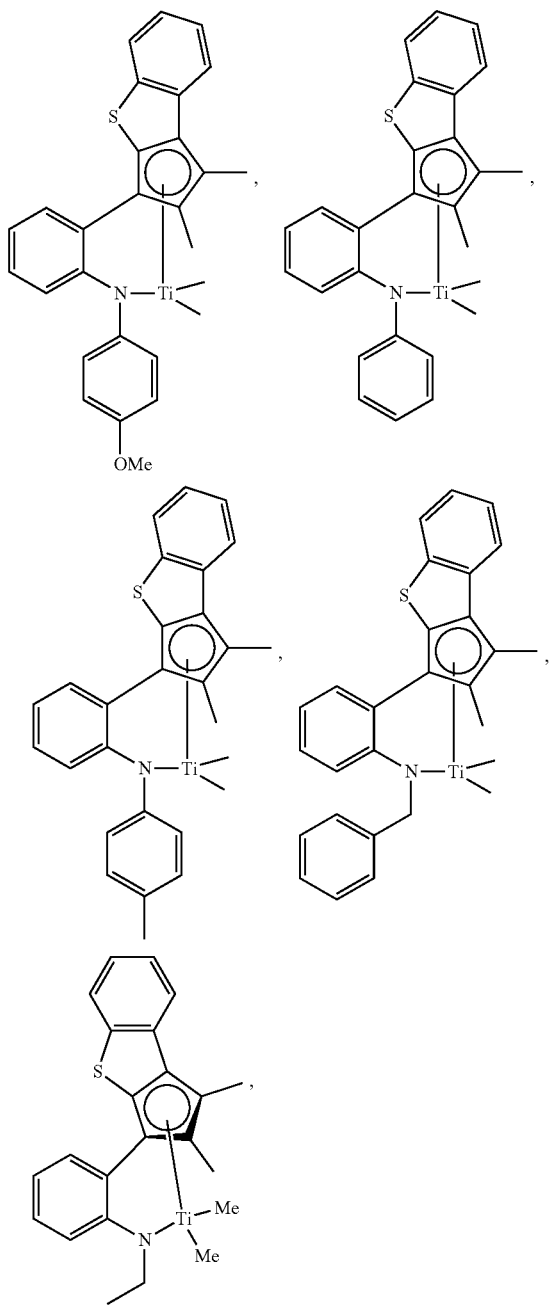

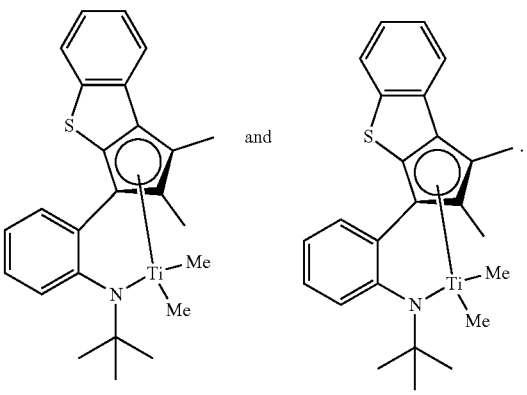

The transition metal compound represented by Chemical Formula 1 may be a compound represented by the following Chemical Formula 3 when $R_{11}$ is connected to $R_{10}$ adjacent to $R_{11}$ to form an aliphatic ring having 5 to 20 carbon atoms or an aromatic ring having 6 to 20 carbon atoms:

<Chemical Formula 3>

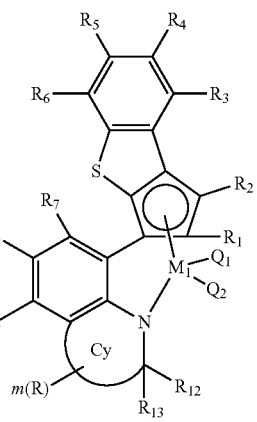

in Chemical Formula 3. $M_1$, $Q_1$, $Q_2$, $R_1$ to $R_9$ are the same as defined in Chemical Formula 1, Cy is an aliphatic cyclic group having 4 or 5 carbon atoms including nitrogen (N), R, $R_{12}$ and $R_{13}$ are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms and an arylalkyl group having 7 to 20 carbon atoms;

m is an integer of 0 to 2 when Cy is an aliphatic cyclic group having 4 carbon atoms, and it may be an integer of 0 to 4 when Cy is an aliphatic ring having 5 carbon atoms.

More specifically, the compound of Chemical Formula 3 may be a compound of the following Chemical Formula 3a or 3b:

<Chemical Formula 3a>

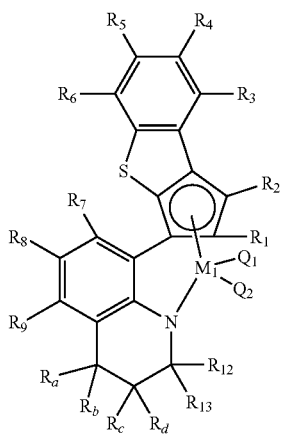

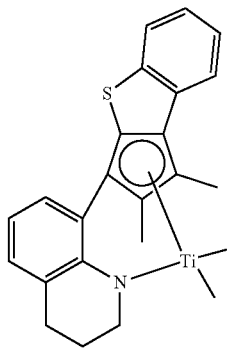
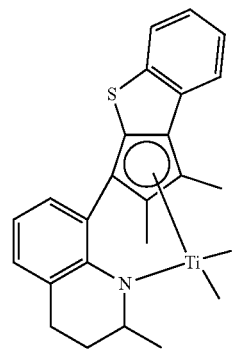

in Chemical Formula 3a, Ra to Rd are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and the remaining substituents are the same as defined in Chemical Formula 1,

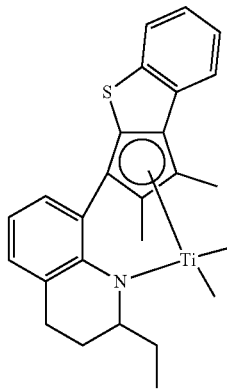
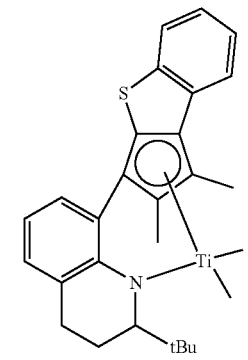

<Chemical Formula 3b>

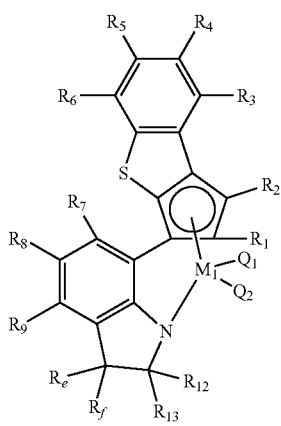

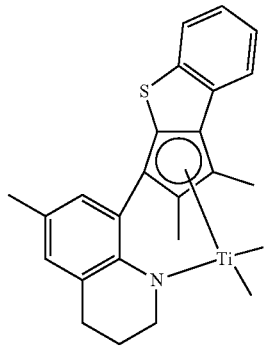

in Chemical Formula 3b,

Re and Rf are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and the remaining substituents are the same as defined in Chemical Formula 1.

Specific examples of the transition metal compound represented by Chemical Formula 3 may be a compound represented by the following Chemical Formulas:

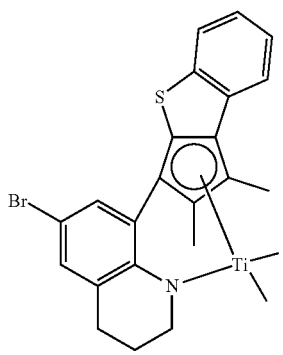

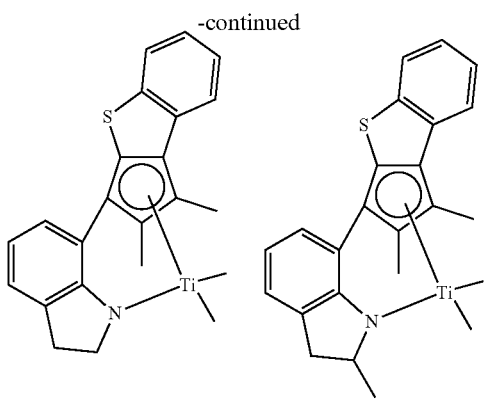

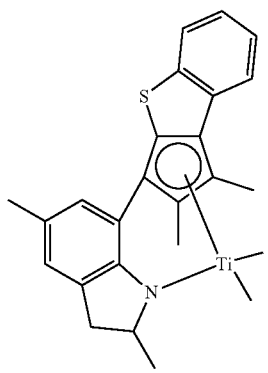

A specific method for preparing the above-mentioned transition metal compound of Chemical Formula 1 is described in the following preparation examples, and thus additional explanation relating thereto will be omitted.

Meanwhile, the transition metal compound of Chemical Formula 2 may be a compound of Chemical Formula 2a.

<Chemical Formula 2a>

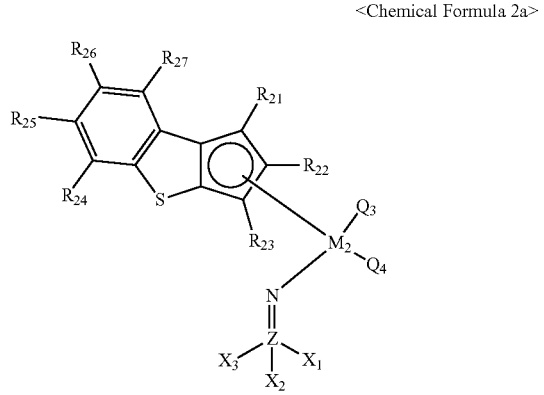

in Chemical Formula 2a, $M_2$ may be the same as previously defined, specifically, $M_2$ may be Ti, Hf or Zr. $Q_3$ and $Q_4$ may be the same as previously defined, specifically, $Q_3$ and $Q_4$ may be each independently a halogen or an alkyl group having 1 to 8 carbon atoms, $R_{21}$ to $R_{27}$ may be the same as previously defined, more specifically, $R_{21}$ to $R_{27}$ are each independently selected from the group consisting of hydrogen, a halogen, a silyl group, an alkyl group having 1 to 8 carbon atoms, an alkenyl group having 2 to 6 carbon atoms, a cycloalkyl group having 3 to 12 carbon atoms, an aryl group having 6 to 18 carbon atoms, an alkylaryl group having 7 to 18 carbon atoms, an arylalkyl group having 7 to 18 carbon atoms, and a metalloid radical of a Group 14 metal substituted with a hydrocarbyl group having from 1 to 8 carbon atoms, more specifically, $R_{21}$ to $R_{27}$ are each independently hydrogen or an alkyl group having 1 to 8 carbon atoms or 1 to 4 carbon atoms; $X_1$ to $X_3$ may be the same as previously defined, more specifically, $X_1$ to $X_3$ are each independently selected from the group consisting of hydrogen, a halogen, a silyl group, an amino group, an alkyl amino group (having 1 to 8 carbon atoms), an alkyl group having 1 to 8 carbon atoms, an alkenyl group having 2 to 6 carbon atoms, a cycloalkyl group having 3 to 12 carbon atoms, an aryl group having 6 to 18 carbon atoms, an alkylaryl group having 7 to 18 carbon atoms and an arylalkyl group having 7 to 18 carbon atoms; or two adjacent functional groups of $X_1$ to $X_3$ are connected to each other to form a cycloalkyl group having 5 to 12 carbon atoms or an aryl group having 6 to 20 carbon atoms which is substituted with at least one substituent selected from the group consisting of a halogen, a silyl group, an amino group, an alkyl amino group (having 1 to 8 carbon atoms), an alkyl group having 1 to 8 carbon atoms, an alkenyl group having 2 to 6 carbon atoms and an aryl group having 6 to 12 carbon atoms, more specifically, $X_1$ to $X_3$ may be each independently selected from the group consisting of a halogen group, an alkyl group having 1 to 8 carbon atoms, a cycloalkyl group having 3 to 12 carbon atoms and an aryl group having 6 to 12 carbon atoms.

More specifically, a second transition metal compound of Chemical Formula 2, which is more preferred for controlling the electronic and steric environment around a metal, may be the following compounds, and any one or a mixture of two or more among them may be used.

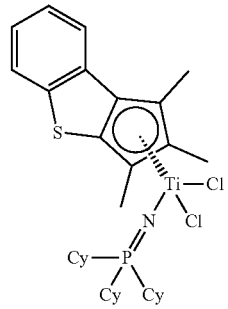

(2-1)

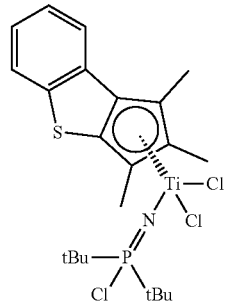

(2-2)

-continued (2-3)

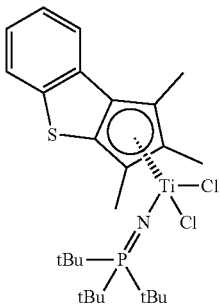

(2-4)

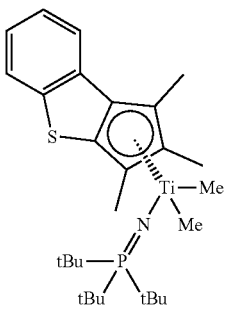

(2-5)

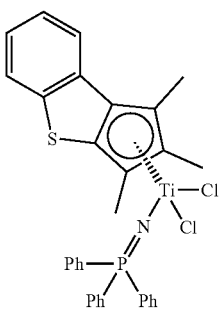

in Chemical Formulas, Cy denotes a cyclohexyl group, tBu denotes a t-butyl group. Me denotes a methyl group, and Ph denotes a phenyl group.

A specific method for preparing the above-mentioned transition metal compound of Chemical Formula 2 is also described in the following Preparation Examples.

The catalyst composition used in the preparation of the olefin-based copolymer may specifically include the transition metal compounds of Chemical Formulas 1 and 2 in a weight ratio of 99:1 to 1:99. When the mixing ratio of the transition metal compounds of Chemical Formulas 1 and 2 is out of the above range, it is difficult to prepare an olefin-based copolymer satisfying the above-described properties. More specifically, the catalyst composition may include the transition metal compounds of Chemical Formulas 1 and 2 in a weight ratio of 50:50 to 80:20.

In addition, the catalyst composition may further include a cocatalyst.

The cocatalyst can be used without particular limitation, as long as it is known in the relevant technical field, e.g., alkylaluminoxane, alkylaluminum or Lewis acid. Specifically, the cocatalyst may include any one or a mixture of two or more selected from the group consisting of compounds represented by the following Chemical Formulas 9 to 12:

-[Al($R_{41}$)—O]$a$-  <Chemical Formula 9>

In Chemical Formula 9, each $R_{41}$ is independently a halogen, a hydrocarbyl group having 1 to 20 carbon atoms or a halogen-substituted hydrocarbyl group having 1 to 20 carbon atoms, a is an integer of 2 or more.

D($R_{42}$)$_3$  <Chemical Formula 10> in Chemical Formula 10. D is aluminum or boron, each $R_{42}$ is each independently a halogen, a hydrocarbyl group having 1 to 20 carbon atoms, or a halogen-substituted hydrocarbyl radical having 1 to 20 carbon atoms,

[L-H]+[Z(A)$_4$]-  <Chemical Formula 11>

[L]+[Z(A)$_4$]-  <Chemical Formula 12> in Chemical Formulae 11 and 12, L is a neutral or cationic Lewis acid, H is hydrogen, Z is a Group 13 element, each A is independently an aryl group having 6 to 20 carbon atoms or an alkyl group having 1 to 20 carbon atoms, where at least one hydrogen atom may be substituted with a substituent, and the substituent is a halogen, a hydrocarbyl group having 1 to 20 carbon atoms, an alkoxy group having 1 to 20 carbon atoms, or an aryloxy group having 6 to 20 carbon atoms.

The compound represented by Chemical Formula 9 may be alkylaluminoxane, and specific examples thereof include methyl aluminoxane, ethyl aluminoxane, isobutylaluminoxane, butyl aluminoxane, and the like, and methyl aluminoxane is particularly preferred.

The compound represented by Chemical Formula 10 may specifically include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like. More specifically, the compound may be selected from trimethylaluminum, triethylaluminum and triisobutylaluminum.

In addition, the compound represented by Chemical Formula 11 or 12 may specifically include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra (p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, or the like.

The addition amount of the above-described cocatalyst compound may be included in a molar ratio of about 1:1 to 1:20 based on the transition metal compound of Chemical Formulas 1 and 2. In order to express the effect due to the above-mentioned cocatalyst compound more than a certain level, the content of the cocatalyst compound may be in a molar ratio of 1:1 or more with respect to the main catalyst compound of the transition metal compound of Chemical Formulas 1 and 2. Further, in order to control appropriate physical properties of the produced olefin-based copolymer and effectively activate the main catalyst compound, the cocatalyst compound may be included in a molar ratio of 1:20 or less with respect to the main catalyst compound.

Meanwhile, in the method for preparing an olefin-based copolymer, an olefin-based copolymer can be prepared by a method comprising copolymerizing ethylene and an alpha-olefin-containing monomer in the presence of the above-described catalyst composition. The alpha-olefin monomers that can be used herein include 1-butene, 1-pentene, 4-methyl-1-pentene, 1-octene, 1-decene, 1-undecene, 1-dodecene, 1-tetradecene, 1-hexadecene or the like, and 1-octene is more preferred.

Further, the copolymerization step can proceed at a temperature of 120° C., or higher, 120-180° C., or 120-160° C., and it may proceed under pressure of 50 bar or more, or 50 to 120 bar, or 70 to 100 bar.

The copolymerization step may be carried out by a solution process using the above-described catalyst composition, or it can be carried out by a slurry process or a gas phase process using the catalyst composition together with an inorganic carrier such as silica. Hereinafter, more specific progress conditions and methods of the copolymerization step will be described centering on a continuous type solution polymerization process.

In the copolymerization step, a scavenger may be introduced in the reactor in an amount of 0.4 to 5 times the total content of moisture. Such a scavenger serves to remove impurities such as moisture and air that may be contained in the reactants and can be introduced before the initiation of copolymerization of the reactant. For the mixture of the scavenger and the reactant, the scavenger and the reactant can be mixed in a separate reactor other than a polymerization reactor, and the scavenger and reactant may be mixed for a sufficient time in a feed line where the reactants are fed to the polymerization reactor. Preferred examples of the scavenger include trialkylaluminum such as TiBAl (triisobutylaluminum) or TOA (trioctylaluminum), but are not limited thereto.

In addition, the copolymerization step can be carried out by introduction of the above-described catalyst composition, monomer and scavenger in the reactor.

In this case, the copolymerization step may be dissolved or diluted in an aliphatic hydrocarbon solvent having 5 to 12 carbon atoms suitable for the olefin polymerization process, such as pentane, hexane, heptane, nonane, decane, or an isomer thereof; an aromatic hydrocarbon solvent such as toluene or benzene; or a hydrocarbon solvent substituted with a chlorine atom such as dichloromethane and chlorobenzene, and injected.

In one embodiment in which the copolymerization step proceeds, the molar ratio between ethylene and solvent needs to be a ratio suitable for dissolving the reactant and the resulting olefin-based copolymer. For example, the molar ratio of (ethylene/solvent) may be about 1/10,000 to 10, or about 1/100 to 5, or about 1/20 to 1. By appropriately setting such a molar ratio, the copolymerization step can be effectively carried out, and also the amount of the solvent can be optimized, thereby suppressing an increase in instruments and an increase in the energy cost due to the purification and recycling of the solvent.

The solvent may be introduced into a reactor at a temperature of about −40 to 150° C. using a heater or a freezer, and the polymerization reaction may be initiated with the monomers and the catalyst composition.

In addition, the large-capacity pump allows the pressure to increase to about 50 bar or more and supply feeds (solvent, monomer, catalyst composition, etc.), and thereby a mixture of the feeds can be passed without additional pumping between the reactor arrangement, the pressure drop device, and the separator.

The olefin-based copolymer produced in the reactor can be maintained at a concentration of less than about 20 mass % in the solvent, and after a short residence time has elapsed, it can be transferred to a primary solvent separation step in order to remove the solvent. An appropriate time for the olefin-based copolymer to stay in the reactor can be from about 1 minute to 10 hours, or from about 3 minutes to 1 hour, or from about 5 minutes to 30 minutes. Thereby, it is possible to suppress a decrease in productivity, a loss of catalyst, etc., and to optimize the size of the reactor.

After the above-described copolymerization step is carried out, in order to remove the solvent present together with the olefin-based copolymer leaving the reactor, a solvent separation step can be further carried out by changing the temperature and pressure of the solution. At this time, the copolymer solution transferred from the reactor maintains a molten state through a heater, and the unreacted feed solvent is vaporized by a separator, and the produced copolymer can be pelletized with an extruder or the like.

On the other hand, the polypropylene-based resin composition of one embodiment includes a polypropylene-based resin together with the above-mentioned olefin-based copolymer. The kind of the polypropylene-based resin is not particularly limited, and for example, it may include various polypropylene-based resins such as polypropylene homopolymers, propylene-alpha-olefin copolymers, or propylene-ethylene-alpha-olefin copolymers.

In this case, as the alpha-olefin, an alpha-olefin having 4 or more carbon atoms different from the above-mentioned propylene, for example, 1-butene, 1-pentene, 4-methyl-1-pentene, 1-hexene, 1-heptene, 1-octene, 1-decene, 1-undecene, 1-dodecene, 1-tetradecene, 1-hexadecene, or the like can be used without particular limitation.

In addition, the polypropylene-based resin may be polymerized and produced by a previously known method or can be used by obtaining a commercially available resin.

The polypropylene-based resin composition of one embodiment may contain 50 to 90% by weight or 60 to 85% by weight of the polypropylene-based resin, and 10 to 50% by weight, or 15 to 40% by weight of the olefin-based copolymer. Thus, it can exhibit more improved impact strength due to the addition of the olefin-based copolymer, while maintaining mechanical properties such as excellent strength possessed by the polypropylene-based resin.

In addition, the polypropylene-based resin composition may further contain additives such as an antioxidant, a heat stabilizer, an ultraviolet stabilizer or an antistatic agent, if necessary. Of course, in order to improve paintability, a small amount of an adhesive resin or an additive having a polar group may be further included within a proper amount range.

Since the polypropylene-based resin composition of one embodiment described above exhibits more improved impact strength together with mechanical properties such as excellent strength, and thus can be applied to various uses/fields requiring these physical properties. For example, the polypropylene-based resin composition is usefully used for hollow molding, extrusion molding or injection molding in various fields and applications such as various packaging materials, building materials, daily necessities and the like, including automobiles, shoes, electric wires, toys, fibers, medical materials, and the like.

In particular, as the polypropylene-based resin composition and the molded article containing the same exhibit excellent impact strength at normal temperature and low temperature, they can be preferably used as molded articles for interior and exterior parts of automobiles.

Advantageous Effects

As described above, according to the present invention, a polypropylene-based resin composition exhibiting mechanical properties such as excellent strength and having more improved impact strength, and a molded article comprising the same can be provided.

BRIEF DESCRIPTION OF DRAWINGS

FIG. 1 shows the results of the temperature rising elution fractionation (TREF) analysis of an olefin-based copolymer of Preparation Example 3.

FIG. 2 shows the results of the gel permeation chromatography (GPC) analysis of an olefin-based copolymer of Preparation Example 3.

FIG. 3 shows the results of the temperature rising elution fractionation (TREF) analysis of an olefin-based copolymer of Comparative Preparation Example 1.

EXAMPLES

Hereinafter, preferred examples will be set forth for better understanding of the present invention. The following examples are merely illustrative of the present invention, and the scope of the present invention should not be construed to be limited thereby.

In the following examples, organic reagents and solvents were purchased from Aldrich and Merck, and purified by a standard method. In all synthesis steps, the contact between air and moisture were blocked to enhance the reproducibility of experiments. In addition, in the following examples, the term "overnight" means a period of about 12 to 16 hours, and the term "room temperature" refers to a temperature of 20 to 25° C. The synthesis of all the transition metal compounds and the preparation of experiments were carried out using the dry box technique or glass tools maintained in dry condition under the dry nitrogen atmosphere. All the solvents used in the examples were of the HPLC level and dried before use.

Preparation Example 1

Preparation of 8-(1,2-dimethyl-1H-benzo[b]cyclopenta[d]thiophen-3-yl)-2-methyl-1,2,3,4-tetrahydroquinoline nBuLi (14.9 mmol, 1.1 eq) was slowly added dropwise in a solution of 2-methyl-1,2,3,4-tetrahydroquinoline (2 g, 13.6 mmol) dissolved in 10 mL of ether at −40° C. The temperature was slowly elevated to room temperature, and the mixture was stirred at room temperature for 4 hours. The temperature was lowered to −40° C., again and $CO_2(g)$ was injected. The reaction was maintained for 0.5 hours at a low temperature. The temperature was slowly elevated, and remaining $CO_2(g)$ was removed via a bubbler. THF (17.6 mmol, 1.4 ml) and tBuLi (10.4 mmol, 1.3 eq) were injected in the reaction mixture at −20° C., and then aged at a low temperature at −20° C. for 2 hours. The ketone (1.9 g, 8.8 mmol) was dissolved in diethyl ether solution and slowly added dropwise to the reaction mixture. After stirring at room temperature for 12 hours, 10 mL of water was injected and hydrochloric acid (2N, 60 mL) was added to the reactant, followed by stirring for 2 minutes. Organic solvents were extracted and the reactant was neutralized with a $NaHCO_3$ aqueous solution. Then, the organic solvent was extracted and dried with $MgSO_4$. Through silica gel column chromatography, a yellow oil (1.83 g, yield 60%) was obtained.

1H NMR (C6D6): δ 1.30 (s, 3H, CH3), 1.35 (s, 3H, CH3), 1.89~1.63 (m, 3H, Cp-H quinoline-CH2), 2.62~2.60 (m, 2H, quinoline-CH2), 2.61~2.59 (m, 2H, quinoline-NCH2), 2.70~2.57 (d, 2H, quinoline-NCH2), 3.15~3.07 (d, 2H, quinoline-NCH2), 3.92 (broad, 1H, N—H), 6.79~6.76 (t, 1H, aromatic), 7.00~6.99 (m, 2H, aromatic), 7.30~7.23 (m, 2H, aromatic), 7.54~7.53 (m, 1H, aromatic), 7.62~7.60 (m, 1H, aromatic) ppm Preparation of 8-(1,2-dimethyl-1H-benzo[b]cyclopenta[d]thiophen-3-yl)-2-methyl-1,2,3,4-tetrahydroquinoline-titanium Dichloride nBuLi (3.0 mmol, 2.1 eq) was slowly added dropwise to the ligand of 8-(1,2-dimethyl-1H-benzo[b]cyclopenta[d]thiophen-3-yl)-2-methyl-1,2,3,4-tetrahydroquinoline prepared above (1.0 g, 2.89 mmol) at −20° C. It was observed that a yellow slurry was formed, and the temperature was slowly elevated to room temperature, followed by stirring at room temperature for 12 hours. $TiCl_4DME$ (806 mg, 2.89 mmol, 1.0 eq) was added dropwise thereto, and then stirred at room temperature for 12 hours. After removal of the solvent, the reactant was extracted with toluene to obtain a red solid (700 mg, yield 52%).

1H NMR (C6D6): δ 1.46~1.467 (t, 2H, quinoline-NCH2), 1.85 (s, 3H, Cp-CH3), 1.79 (s, 3H, Cp-CH3), 2.39 (s, 3H, Cp-CH3), 2.37 (s, 3H, Cp-CH3), 2.10~2.07 (t, 2H, quinoline-NCH2), 5.22~5.20 (m, 1H, N—CH), 5.26~5.24 (m, 1H, N—CH), 6.89~6.87 (m, 2H, aromatic) 6.99~6.95 (m, 1H, aromatic), 7.19~7.08 (m, 2H, aromatic), 7.73~7.68 (m, 1H, aromatic) ppm Preparation Example 2

The compound (1.30 g, 2.37 mmol) represented by the following Chemical Formula i was dissolved in toluene (20 ml) and then MeMgBr (1.62 ml. 4.86 mmol, 2.05 eq.) was slowly added dropwise thereto at room temperature (23° C.). The mixture was then stirred at room temperature for 12 hours. It was confirmed by NMR that the starting material was disappeared, and the toluene solvent was filtered under reduced pressure, and the reaction mixture was dissolved in hexane (30 ml). The solid was then removed via filtration. The hexane solvent in the resulting solution was filtered under reduced pressure to obtain a transition metal compound of the following Chemical Formula ii.

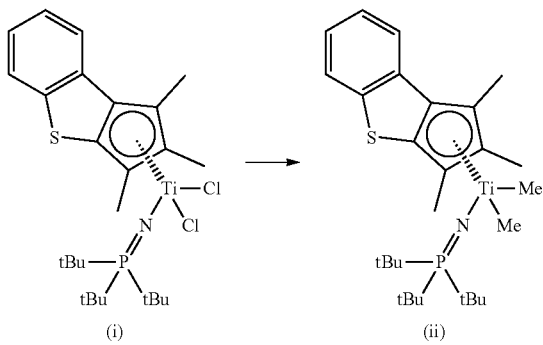

<Preparation of Olefin-Based Copolymer>

Preparation Example 3

In a 1.5 L autoclave continuous process reactor, a hexane solvent (4.67 kg/h) and 1-octene (1.55 kg/h) were added, and the temperature of the upper end of the reactor was preheated to 160° C. A triisobutylaluminum compound (0.03 mmol/min), a mixture of the transition metal compound prepared in Preparation Example 1 and the compound prepared in Preparation Example 2 (mixing ratio by weight=75:25, 0.75 μmol/min), and dimethylanilinium tetrakis(pentafluorophenyl)borate cocatalyst (2.25 μmol/min) was simultaneously introduced into the reactor. Then, ethylene (0.87 kg/h) was introduced in the autoclave reactor, and the reaction mixture was maintained under a pressure of 89 bar at 160° C. for 30 minutes, and then a copolymerization reaction was performed in a continuous process to produce an ethylene-1-octene copolymer as an olefin-based copolymer. Next, the remaining ethylene gas was withdrawn and the polymer solution was dried in a vacuum oven for 12 hours or more, and then the physical properties were measured.

Preparation Example 4

An olefin-based polymer was prepared in the same manner as in Example 1, except 1-octene (1.51 kg/h), triisobutylaluminum compound (0.05 mmol/min), a mixture of the transition metal compound prepared in Preparation Example 1 and the compound prepared in Preparation Example 2 (mixing ratio by weight=75:25, 0.75 mol/min), and dimethylanilinium tetrakis(pentafluorophenyl)borate cocatalyst (2.25 μmol/min) were used.

Preparation Example 5

An olefin-based polymer was prepared in the same manner as in Example 1, except 1-octene (1.42 kg/h), triisobutylaluminum compound (0.03 mmol/min), a mixture of the transition metal compound prepared in Preparation Example 1 and the compound prepared in Preparation Example 2 (mixing ratio by weight=75:25, 0.675 μmol/min), and dimethylanilinium tetrakis(pentafluorophenyl)borate cocatalyst (2.03 μmol/min) were used.

Preparation Example 6

An olefin-based polymer was prepared in the same manner as in Example 1, except 1-octene (1.30 kg/h), triisobutylaluminum compound (0.04 mmol/min), a mixture of the transition metal compound prepared in Preparation Example 1 and the compound prepared in Preparation Example 2 (mixing ratio by weight=75:25, 0.58 μmol/min), and dimethylanilinium tetrakis(pentafluorophenyl)borate cocatalyst (1.40 μmol/min) were used.

Comparative Preparation Example 1

An ethylene-1-octene copolymer having a talc coating layer (product name: Eg8407) from Dow Co., which was prepared by using only one type of metallocene catalyst, was prepared.

Comparative Preparation Example 2

An ethylene-1-octene copolymer (product name: LC670) from LG Chem. Ltd., which was prepared by using only one type of metallocene catalyst, was prepared.

Comparative Preparation Example 3

An ethylene-1-octene copolymer (product name: Eg8200) from Dow Co., which was prepared by using only one type of metallocene catalyst, was prepared.

Comparative Preparation Example 4

An ethylene-1-octene copolymer (product name: LC170) from LG Chem. Ltd., which was prepared by using only one type of metallocene catalyst, was prepared.

Experimental Example 1: Evaluation of Physical Properties of Olefin-Based Copolymer Various physical properties of the olefin-based copolymers prepared in Preparation Examples 3-6 and Comparative Preparation Examples 1-4 were measured and evaluated by the methods described below.

(1) Density of a polymer (g/cc); measured according to ASTM D-792.

(2) Melt index of a polymer (MI, g/10 min); measured according to ASTM D-1238 (condition E, 190° C., load of 2.16 kg).

(3) Weight average molecular weight (Mw, g/mol) and molecular weight distribution (MWD); Each of a number average molecular weight (Mn) and a weight average molecular weight (Mw) was measured using gel permeation chromatography (GPC), and the weight average molecular weight was divided by the number average molecular weight to calculate molecular weight distribution (MWD).

(4) TREF (Temperature rising elution fractionation)

TREF was measured with a TREF equipment from Polymer Char using o-dichlorobenzene as a solvent in a range of −20° C. to 120° C. In detail, 40 mg of a polymer sample was dissolved in 20 ml of an o-dichlorobenzene solvent at 135° C. for 30 minutes and stabilized at 95° C. for 30 minutes. The resultant solution was introduced in a TREF column and cooled up to −20° C., at a cooling rate of 0.5° C./min, and the temperature was kept for 2 minutes. Then, the temperature was increased by heating from −20° C. to 120° C., at a heating rate of 1° C./min, and the concentration of an eluted polymer was measured while flowing the o-dichlorobenzene solvent in the column at the flowing rate of 0.5 mL/min.

(5) Number of GPC peak: observed through gel permeation chromatography (GPC) analysis.

The above-described physical property measurement and evaluation results are shown in Table 1 and FIGS. 1 to 3. FIGS. 1 and 2 shows the results of the temperature rise elution fractionation (TREF) analysis and gel permeation chromatography (GPC) analysis of the olefin-based copolymer prepared in Preparation Example 3, and FIG. 3 shows the results of the temperature rise elution fractionation (TREF) analysis of the olefin-based copolymer obtained in Comparative Preparation Example 1.

of 0.850 to 0.910 g/cc. In contrast, the polymers of Comparative Preparation Examples 1 to 4 showed only one peak within the same density range.

Examples 1 to 4 and Comparative Examples 1 to 4: Preparation of Polypropylene-Based Resin Composition 20 wt % of the polymers of Preparation Examples 3 to 6 and Comparative Preparation Examples 1 to 4 and 80 wt % of polypropylene (trade name: M1600, LG Chem. Ltd.) were mixed to prepare a polypropylene-based resin composition. More specifically, first, the above components were homogeneously mixed using a Henschel mixer to prepare the above composition. Such composition was pelletized with a co-rotating twin screw extruder and specimens for measuring physical properties were prepared using an injection machine.

Experimental Example 2: Evaluation of Physical Properties of Polypropylene-Based Resin Composition For the polypropylene-based resin composition specimens respectively prepared in Examples 1 to 4 and Comparative Examples 1 to 4, the flexural strength, flexural modulus, tensile strength, impact strength at low temperature and normal temperature, and shrinkage were measured by the following methods, and the results are summarized in Table 2 below.

1) Flexural strength and flexural modulus: measured according to ASTM D 790 standard using an INSTRON 3365 instrument.

2) Tensile strength: measured according to ASTM D 639 standard using an INSTRON 4465 instrument.

3) Normal-temperature Izod impact strength (IZOD, @ 23° C.): measured under the conditions of ASTM D 256, 1/4", 23±5° C.

TABLE 1

| Unit | Density g/cc | Melt index g/10 min | TREF Te1(° C.); fraction ratio (%) | TREF Te2(° C.); fraction ratio (%) | TREF Te1(° C.); fraction ratio (%) | Numben of TREF peak number | Number of GPC peak number |
|---|---|---|---|---|---|---|---|
| Preparation Example 3 | 0.867 | 24.5 | −6.7; 58 | 38.8; 22 | 87.6; 20 | 3 | 1 |
| Preparation Example 4 | 0.871 | 6.3 | 0.3; 45 | 41.0; 22 | 88.0; 33 | 3 | 1 |
| Preparation Example 5 | 0.869 | 10 | 0.5; 70 | 41.4; 18 | 89.0; 12 | 3 | 1 |
| Preparation Example 6 | 0.873 | 1.7 | −20.0; 44 | 30.1; 14 | 89.6; 42 | 3 | 1 |
| Comparative Preparation Example 1 | 0.871 | 27.9 | 33.2; 100 | — | — | 1 | 1 |
| Comparative Preparation Example 2 | 0.869 | 5.1 | 26.6; 100 | — | — | 1 | 1 |
| Comparative Preparation Example 3 | 0.873 | 4.9 | 34.8; 100 | — | — | 1 | 1 |
| Comparative Preparation Example 4 | 0.872 | 1.1 | 28.4; 100 | — | — | 1 | 1 |

Referring to Table 1 and FIGS. 1 to 3, the olefin-based copolymers of Preparation Examples 3 to 6 showed three peaks of Te1, Te2 and Te3 on TREF within a density range 4) Low-temperature Izod impact strength (IZOD, @ −30° C.): measured under the conditions of ASTM D 256, 1/4", −30±5° C.

TABLE 2

| | Sample | | | | | | | |
|---|---|---|---|---|---|---|---|---|
| | Comparative Example 1 | Comparative Example 2 | Comparative Example 3 | Comparative Example 4 | Example 1 | Example 2 | Example 3 | Example 4 |
| | Polymer | | | | | | | |
| | Comparative Preparation Example 1 | Comparative Preparation Example 2 | Comparative Preparation Example 3 | Comparative Preparation Example 4 | Preparation Example 3 | Preparation Example 4 | Preparation Example 5 | Preparation Example 6 |
| Flexural strength (kgf/cm$^2$) | 261 | 244 | 249 | 247 | 240 | 247 | 246 | 245 |
| Flexural modulus (Secant 1%) (kgf/cm$^2$) | 8684 | 8058 | 8077 | 8210 | 8055 | 8197 | 8190 | 8198 |
| Tensile strength (kgf/cm$^2$) | 194 | 183 | 186 | 183 | 181 | 187 | 186 | 181 |
| Low-temperature impact strength (−30° C.) (kgf · m/m) | 4.8 | 5.5 | 5.2 | 5.9 | 6.5 | 6.9 | 6.8 | 7.6 |
| Normal-temperature impact strength (23° C.) (kgf · m/m) | 53.9 | 61.6 | 60.1 | 66.2 | 62.3 | 66.6 | 66.2 | 71 |

Referring to Table 2 above, it was confirmed that the specimens of Examples 1 to 4 exhibited more improved impact strength while other physical properties were equal to or higher than those of the specimens of Comparative Examples 1 to 4.

For reference, it was confirmed that the specimen of Comparative Example 1 in which a talc layer was treated on the commercial product itself, exhibited slightly higher flexural strength, flexural modulus, and tensile strength than those of Examples, but it was confirmed that in the absence of the talc layer as the reinforcing material, it showed the flexural strength, flexural modulus and tensile strength similar to those of the specimens of Examples, and that the specimen of Comparative Example 1 exhibited inferior impact strength as compared with Examples.

The invention claimed is:

1. polypropylene-based resin composition comprising: a polypropylene-based resin; and an olefin-based copolymer containing an ethylene repeating unit, and an alpha-olefin-based repeating unit having 4 or more carbon atoms,
   wherein the olefin-based copolymer shows a single peak when analyzed by gel permeation chromatography, and shows three elution temperatures, Te1, Te2 and Te3, in a temperature range of −20° C. to 120° C. when analyzed by temperature rising elution fractionation (TREF), wherein the Te1 is present at a lower temperature than the Te2 and the Te2 is present at a lower temperature than the Te3, and the Te1 is −20° C. to 100° C., the Te2 is 0° C. to 120° C., and the Te3 is 20° C. to 120° C.,
   wherein the olefin-based copolymer includes a first semi-crystalline olefin-based copolymer, a second semi-crystalline olefin-based copolymer and a third semi-crystalline olefin-based copolymer, and
   wherein when the olefin-based copolymer has been analyzed by TREF, a fraction ratio of a peak corresponding to the Te1 for the first semi-crystalline olefin copolymer is 30 to 80%, a fraction ratio of a peak corresponding to the Te2 for the second semi-crystalline olefin copolymer is 5 to 40%, and a fraction ratio of a peak corresponding to the Te3 for the third semi-crystalline olefin copolymer is 5 to 50%.

2. The polypropylene-based resin composition according to claim 1, wherein the olefin-based copolymer further satisfies the following requirements (1) to (3):
   (1) Density measured according to ASTM D-792: 0.850 to 0.910 g/cc,
   (2) Melt index measured at 190° C. under a load of 2.16 kg: 0.1 to 100 g/10 min, and
   (3) Molecular weight distribution: 1.5 to 4.0.

3. The polypropylene-based resin composition according to claim 1, wherein the olefin-based copolymer has a density measured according to ASTM D-792 of 0.86 to 0.88 g/cc, the Te1 is −20° C. to 30° C., the Te2 is 10° C. to 80° C., and the Te3 is 40° C. to 120° C.

4. The polypropylene-based resin composition according to claim 1, wherein the olefin-based copolymer has three crystallization temperatures (Te1, Te2, Te3) in DSC curve, Te1 is 5° C. or less, Te2 is 0° C. to 60° C., and Tc3 is 80° C. to 130° C.

5. The polypropylene-based resin composition according to claim 1, wherein the olefin-based copolymer has a weight average molecular weight (Mw) of 10,000 to 500,000 g/mol.

6. The polypropylene-based resin composition according to claim 1, wherein the polypropylene-based resin comprises at least one of polypropylene homopolymer, propylene-alpha-olefin copolymer, or propylene-ethylene-alpha-olefin copolymer.

7. The polypropylene-based resin composition according to claim 1, wherein the composition comprises 50 to 90% by weight of the polypropylene-based resin and 10 to 50% by weight of the olefin-based copolymer.

8. The polypropylene-based resin composition according to claim 1, wherein the alpha-olefin-based repeating unit is a repeating unit derived from one or more alpha-olefins selected from the group consisting of 1-butene, 1-pentene, 1-hexene, 1-heptene 1-octene, 1-decene, 1-unclecene, 1-dodecene, 1-tetradecene and 1-hexadecene.

9. A molded product comprising the polypropylene-based resin composition of claim 1.

10. The polypropylene-based resin composition according to claim 1, wherein the olefin-based copolymer has a molecular weight distribution (MWD) of 1.5 to 4.0.

11. The polypropylene-based resin composition according to claim 1, wherein the olefin-based copolymer is prepared by a method comprising the step of copolymerizing ethylene and alpha-olefin in the presence of a catalyst composition comprising a transition metal compound of the following Chemical Formula 1 and a transition metal compound of the following Chemical Formula 2:

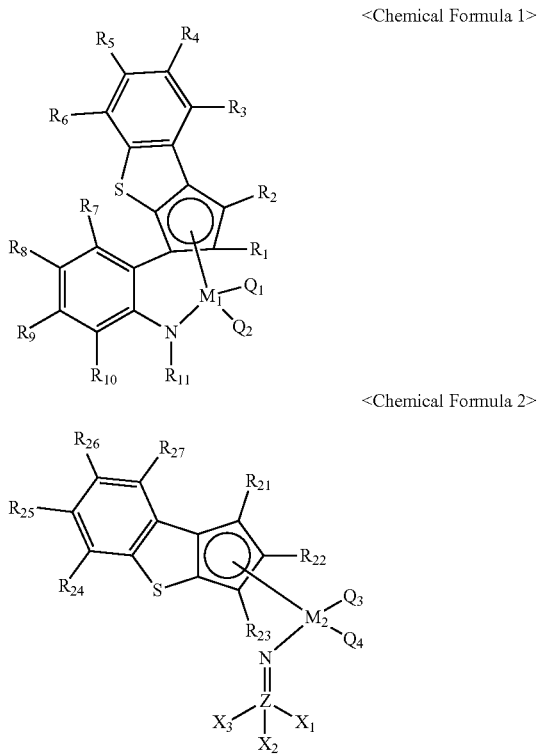

<Chemical Formula 1>

<Chemical Formula 2> in Chemical Formulae 1 and 2, $M_1$ and $M_2$ are each independently a Group 4 transition metal, $Q_1$, $Q_2$, $Q_3$ and $Q_4$ are each independently selected from the group consisting of hydrogen, a halogen, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, an alkylamido group having 1 to 20 carbon atoms, an arylamido group having 6 to 20 carbon atoms, and an alkylidene having 1 to 20 carbon atoms, $R_1$ to $R_6$ are each independently selected from the group consisting of hydrogen, a halogen, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms and a metalloid radical of a Group 14 metal substituted with a hydrocarbyl group having 1 to 20 carbon atoms; or at least two adjacent functional groups of $R_1$ to $R_6$ are connected to each other to form an aliphatic ring having 5 to 20 carbon atoms or an aromatic ring having 6 to 20 carbon atoms which is unsubstituted or substituted with at least one substituent selected from the group consisting of a halogen, an alkyl group having 1 to 20 carbon atoms, an alkenyl group having 2 to 20 carbon atoms and an aryl group having 6 to 20 carbon atoms, $R_7$ to $R_{11}$ are each independently selected from the group consisting of hydrogen, a halogen, an amino group, an alkyl amino group having 1 to 20 carbon atoms, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, and a metalloid radical of a Group 14 metal substituted with a hydrocarbyl group having from 1 to 20 carbon atoms; or at least two adjacent functional groups of $R_7$ to $R_{11}$ are connected to each other to form an aliphatic ring having 5 to 20 carbon atoms or an aromatic ring having 6 to 20 carbon atoms which is unsubstituted or substituted with at least one substituent selected from the group consisting of a halogen, an alkyl group having 1 to 20 carbon atoms, an alkenyl group having 2 to 20 carbon atoms and an aryl group having 6 to 20 carbon atoms, $R_{21}$ to $R_{27}$ are each independently selected from the group consisting of hydrogen, a halogen, a silyl group, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, and a metalloid radical of a Group 14 metal substituted with a hydrocarbyl group having from 1 to 20 carbon atoms, $X_1$ to $X_3$ are each independently selected from the group consisting of hydrogen, a halogen, a silyl group, an amino group, an alkyl amino group having 1 to 20 carbon atoms, an alkyl group having 1 to 20 carbon atoms, an alkenyl group having 2 to 20 carbon atoms, a cycloalkyl group having 3 to 20 carbon atoms, an aryl group having 6 to 20 carbon atoms, an alkylaryl group having 7 to 20 carbon atoms and an arylalkyl group having 7 to 20 carbon atoms; or at least two adjacent functional groups of $X_1$ to $X_3$ are connected to each other to form an aliphatic ring having 5 to 20 carbon atoms or an aromatic ring having 6 to 20 carbon atoms which is unsubstituted or substituted with at least one substituent selected from the group consisting of a halogen group, a silyl group, an amino group, an alkyl amino group having 1 to 20 carbon atoms, an alkyl group having 1 to 20 carbon atoms, an alkenyl group having 2 to 20 carbon atoms and an aryl group having 6 to 20 carbon atoms, and Z is phosphorus (P), arsenic (As) or antimony (Sb).

12. The polypropylene-based resin composition according to claim 11, wherein the transition metal compound represented by Chemical Formula 1 is a compound represented by the following Chemical Formulas, or a mixture thereof:

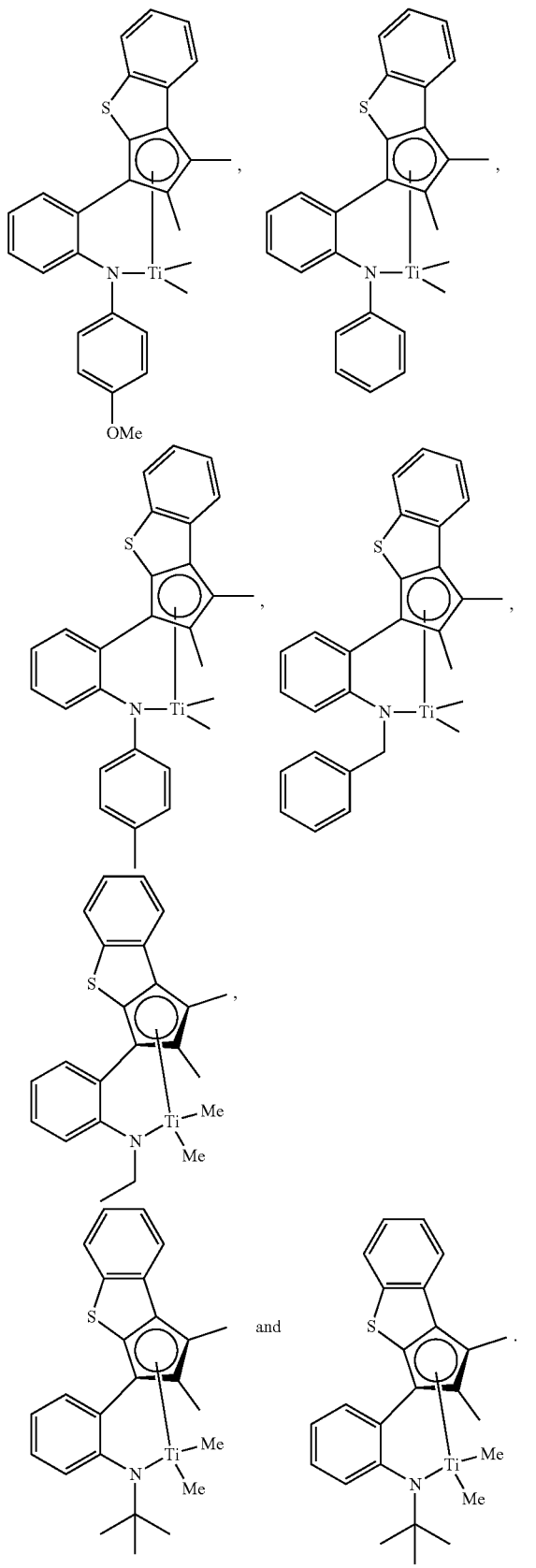

13. The polypropylene-based resin composition according to claim 11, wherein the transition metal compound represented by Chemical Formula 1 is a compound represented by the following Chemical Formula 3:

<Chemical Formula 3>

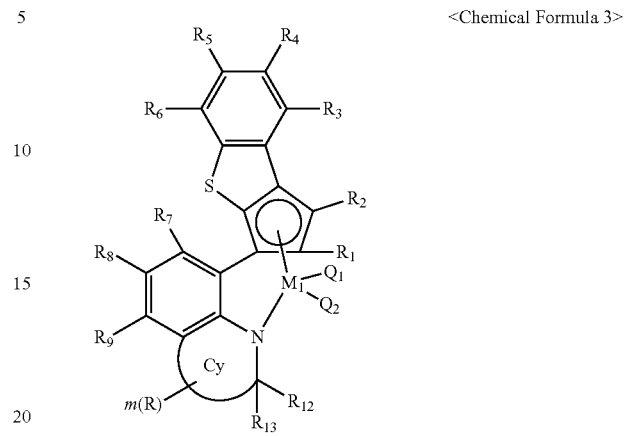

in Chemical Formula 3,

M1, Q1, Q2, R1 to R9 are the same as defined in Chemical Formula 1,

Cy is an aliphatic cyclic group having 4 or 5 carbon atoms including nitrogen (N), R, R12 and R13 are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms and an arylalkyl group having 7 to 20 carbon atoms, and m is an integer of 0 to 2 when Cy is an aliphatic cyclic group having 4 carbon atoms, and it is an integer of 0 to 4 when Cy is an aliphatic ring having 5 carbon atoms.

14. The polypropylene-based resin composition according to claim 13, wherein the transition metal compound represented by Chemical Formula 3 is a compound represented by the following Chemical Formula 3a or Chemical Formula 3b:

<Chemical Formula 3a>

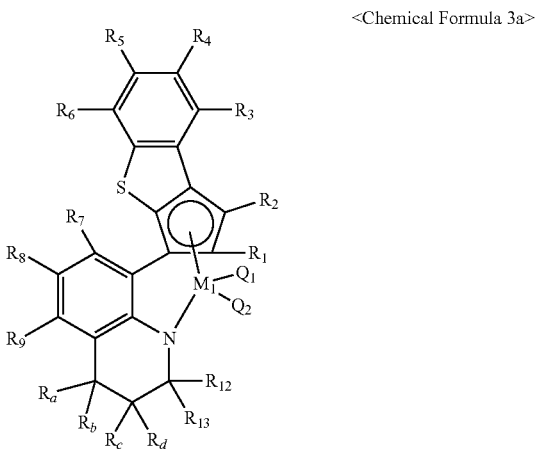

in Chemical Formula 3a,

Ra to Rd are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and M1, Q1, Q2, Ri to R9, R12 and R13 are the same as defined in Chemical Formula 3, <Chemical Formula 3b>

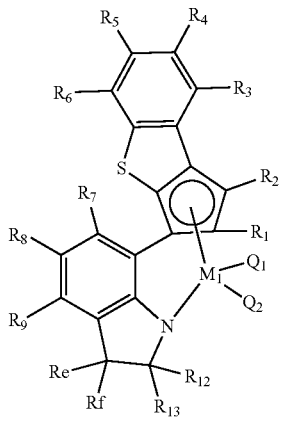

in Chemical Formula 3b,

Re and Rf are each independently selected from the group consisting of hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, and an arylalkyl group having 7 to 20 carbon atoms, and M1, Q1, Q2, R1 to R9, R12 and R13 are the same as defined in Chemical Formula 3.

15. The polypropylene-based resin composition according to claim 13, wherein the transition metal compound represented by Chemical Formula 3 is at least one compound represented by a Chemical Formula selected from:

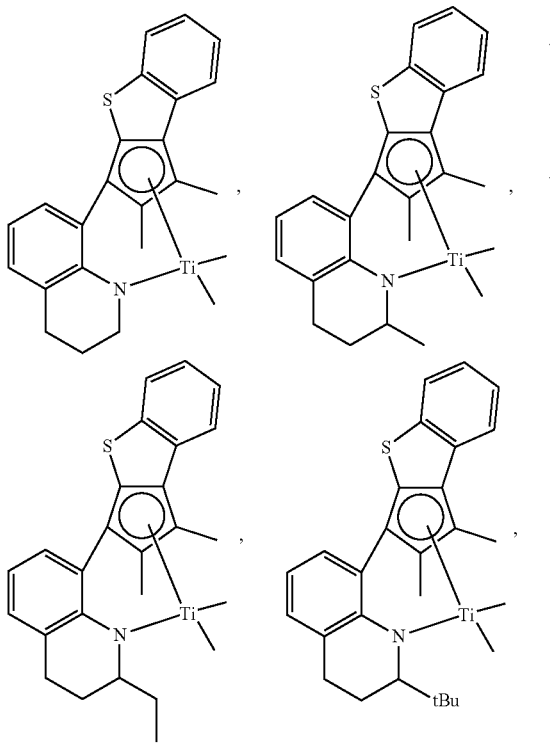

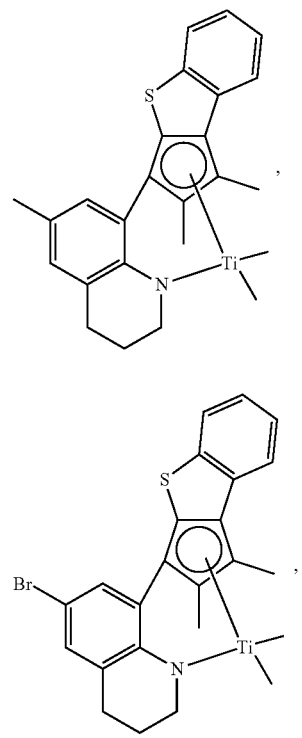

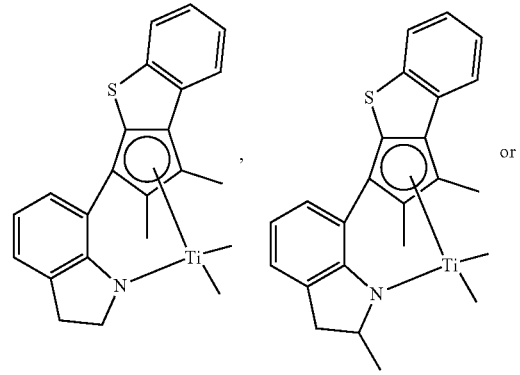

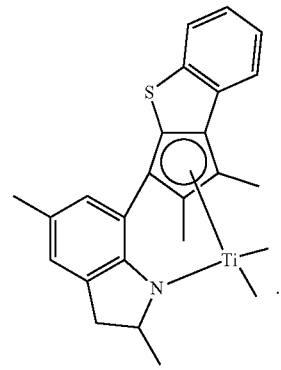

16. The polypropylene-based resin composition according to claim 11, wherein the transition metal compound represented by Chemical Formula 2 is at least one compound represented by a Chemical Formula selected from:

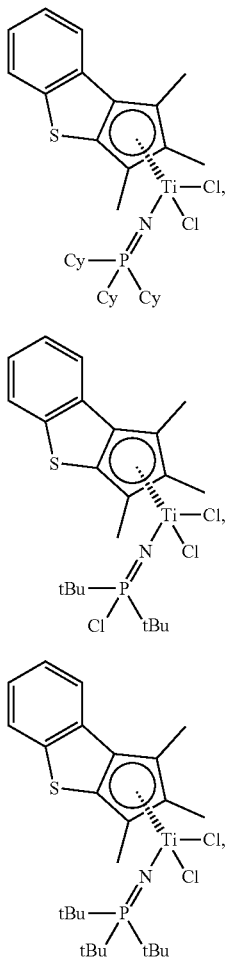

(2-1)

(2-2)

(2-3)

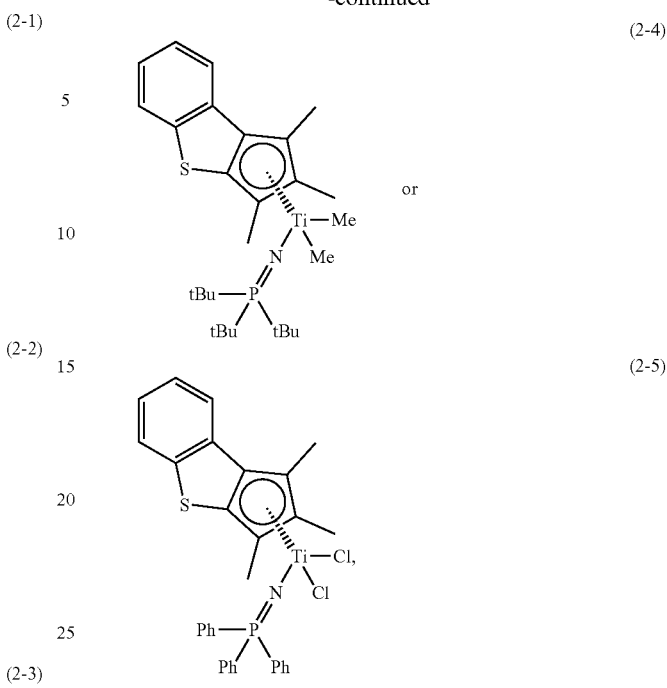

(2-4)

or (2-5)

wherein Cy denotes a cyclohexyl group, tBu denotes a t-butyl group, Me denotes a methyl group, and Ph denotes a phenyl group.

17. The polypropylene-based resin composition according to claim 11, wherein the catalyst composition comprises the transition metal compound represented by Chemical Formula 1 and the transition metal compound represented by Chemical Formula 2 in a weight ratio of 99:1. to 1:99.

* * * * *